United States Patent [19]

Huensch et al.

[11] Patent Number: 4,475,010

[45] Date of Patent: Oct. 2, 1984

[54] HIGH DENSITY CELLULAR MOBILE RADIO COMMUNICATIONS

[75] Inventors: George D. Huensch, Aurora; Robert L. Lien, Batavia; Jerol M. Lind, Wheaton, all of Ill.; Verne H. MacDonald, Elberon, N.J.

[73] Assignee: AT&T Bell Laboratories, Murray Hill, N.J.

[21] Appl. No.: 491,905

[22] Filed: May 5, 1983

[51] Int. Cl.³ .................................... H04Q 7/04
[52] U.S. Cl. ................... 179/2 EB; 455/33; 455/56
[58] Field of Search ............... 179/2 EB, 2 E; 455/33, 455/54, 56

[56] References Cited

U.S. PATENT DOCUMENTS

| | | | |
|---|---|---|---|
| 3,663,762 | 5/1972 | Joel, Jr. | 179/2 EB |
| 3,819,872 | 6/1974 | Hamrick | 179/14 |
| 3,906,166 | 9/1975 | Cooper et al. | 179/2 EB |
| 4,144,411 | 3/1979 | Frenkiel | 179/2 |
| 4,144,412 | 3/1979 | Ito et al. | 455/33 |
| 4,144,496 | 3/1979 | Cunningham et al. | 325/53 |
| 4,228,319 | 10/1980 | De Jager et al. | 179/2 |

OTHER PUBLICATIONS

AT&T Advanced Mobile Phone Service Development Report No. 9: Prepared for the Federal Communications Commission by American Telephone and Telegraph Company and Illinois Bell Telephone Company; May 29, 1979, Attachment II.

V. H. MacDonald, "The Cellular Concept", *The Bell System Technical Journal*, vol. 58, No. 1, Jan. 1979.
N. Ehrlich, R. E. Fisher, and T. K. Wingard, "Cell-Site Hardware", *The Bell System Technical Journal*, vol. 58, No. 1, Jan. 1979.
Z. C. Fluhr and P. T. Porter, "Control Architecture", *The Bell System Technical*, vol. 58, No. 1, Jan. 1979.

*Primary Examiner*—Gene Z. Rubinson
*Assistant Examiner*—W. J. Brady
*Attorney, Agent, or Firm*—P. Visserman

[57] ABSTRACT

In a cellular mobile telecommunication system, a method and apparatus for controlling the process of locating a mobile unit from the cell sites. When a mobile unit goes beyond the radio range of its associated controlling cell site, that cell site sends a message to nearby cell sites to measure and report the strength of the received signal from that mobile on each of their directional antennas and to report radio channel availability. These reports are returned to the controlling cell site which compares the received signal strength mesurements against stored thresholds. The controlling cell site generates and transmits to the mobile telecommunications switching office (MTSO) a hand-off request message including a list of candidate hand-off cell sites and directional antennas. The MTSO then selects an available channel associated with one of the candidate cell sites and antennas and generates a sequence of messages to hand-off communications control from the controlling cell site to a candidate cell site.

27 Claims, 9 Drawing Figures

DATA BASE A (272, FIG. 2)

HIGH DENSITY CELLULAR MOBILE RADIO COMMUNICATIONS

TECHNICAL FIELD

This invention relates to cellular mobile radio communication and, more particularly, to the control of the vehicle location and hand-off processes among cell sites.

BACKGROUND OF THE INVENTION

Mobile telecommunication systems provide communications among mobile units and between mobile units and land-based customer stations using a limited number of radio channels. In the Advanced Mobile Phone Service (AMPS) System described in the *Bell System Technical Journal*, (BSTJ), V. 58, No. 1, pp. 1-269, Jan., 1979, a mobile unit is served by a different radio station, sometimes referred to as a cell site, as it moves from one cell area to another in a region. The radio stations are connected to a controlling mobile telecommunications switching office (MTSO) that provides access to land-based customer stations via the common-carrier telephone network. The cellular arrangement of radio stations makes it possible for distant mobile units to re-use the same radio channels without interference. To prevent a mobile unit from traveling so far out of one cell area that its signal could interfere with communications in a remote cell area using the same radio channel, the signal strength of a mobile unit is monitored by the serving radio station. A "vehicle location" operation is initiated when the signal strength falls sufficiently low to indicate that the mobile unit is leaving the boundary of the cell area.

When the strength of the signals from the mobile unit drop below a threshold value, the serving radio station notifies the MTSO. The MTSO then requests nearby radio stations to measure the received signal strength of the mobile unit. In response to the received signal strength data from the group of nearby radio stations, the MTSO selects the radio station which would best be capable of taking over control of communications with the mobile unit and a "hand-off" of control is made to that radio station.

With a limited number of radio channels and a growing number of mobile units to serve, it is necessary to re-use channels more frequently. This requires a decrease in the size of each cell area and/or a splitting of cell areas into sectors each sector associated with a different directional antenna; in either case, more frequent vehicle location and hand-off operations are required. Each such vehicle location and hand-off requires an intensive usage of the data processing facilities of the MTSO. As an MTSO serves more mobile units, the use of these data processing facilities increases both with the number of calls and with the greater number of hand-offs required per call. Ultimately, the data processing load on an MTSO could be expected to approach saturation. Because the use of multiple MTSO's in one region would be expensive and inefficient it would be advantageous to be able to permit an increase in the number of vehicle locations and handoffs processed by a system without greatly increasing the data processing load on the MTSO.

SUMMARY OF THE INVENTION

In accordance with our invention, the vehicle location process is both initiated and controlled by the cell site currently serving the mobile unit (the controlling cell site). When the signal from a specific mobile unit associated with a controlling cell site drops below a prespecified threshold, the controlling cell site itself selects the group of nearby cell sites which are to measure the signal strength in the radio channel used by the mobile unit.

In accordance with one aspect of our invention, in one illustrative embodiment thereof, the controlling cell site itself receives and processes the return messages indicating the strength of the received signal at each nearby cell site. Based on the signal strength data supplied by the return messages, the controlling cell site generates and sends to the MTSO an ordered list of cell sites which are candidates for assuming control of communications with the specific mobile unit. The MTSO then effects the hand-off of the call from the controlling cell site to another cell site selected from the candidate list.

In accordance with one aspect of our invention, in one illustrative embodiment thereof, the operation of the MTSO is simplified by the provision of packet switching apparatus which permits the MTSO to function primarily as a data switch during the signal strength measuring phase of call control. That is, the MTSO simply passes signal strength measurement request messages from the requesting cell site to each cell site in a list of nearby cell site addresses identified by the controlling cell site in a signal strength measurement request message. The addressed cell sites, in addition to replying with signal strength reports, also furnish data indicating the availability of channels in the channel groups associated with each antenna (antenna/channel groups) at each site. The controlling cell site uses the signal strength reports and antenna/channel availability data to generate the candidate list of hand-off cell sites.

In accordance with another aspect of our invention, in one illustrative embodiment thereof, the controlling cell site further detects when the signal from a specific mobile unit drops below a second prespecified threshold. Only a limited list of nearby cell sites is measured if the signal is only below a first threshold. Candidate antenna/channel groups are selected whose reported signal strength is above an associated primary threshold. If the signal drops below a second threshold, a second group of nearby cell sites is reported. Candidates may be drawn from those antenna/channel groups of that second group of nearby cell sites whose reported signal strength is above an associated primary threshold. Candidates may be further drawn from antenna/channel groups in either group of cell sites whose reported signal strength is below an associated primary threshold but above an associated secondary threshold.

Since the MTSO of our system has neither to generate the list of nearby cell sites for each signal strength request message nor to interpret the reply information to generate the list of optimum hand-off candidates, its workload is greatly reduced. Further, if the controlling cell site receives a sufficiently strong signal from the specific mobile unit on a different one of its antennas than that being used by the mobile unit and a channel associated with that alternate antenna is available, the controlling cell site directly generates a hand-off request data message, specifying the alternate antenna, to the MTSO.

In accordance with another aspect of our invention, in one illustrative embodiment thereof, different groups of nearby cell sites are measured. The choice among the groups of cell sites is made on the basis of the antenna at the serving cell site which receives the strongest signal from the mobile unit. Advantageously, this arrangement makes it most likely that the group of cell sites being measured is in the correct direction.

BRIEF DESCRIPTION OF THE DRAWING

The invention may be better understood from the following detailed description when read with reference to the drawing in which.

GENERAL DESCRIPTION

Figure 1:
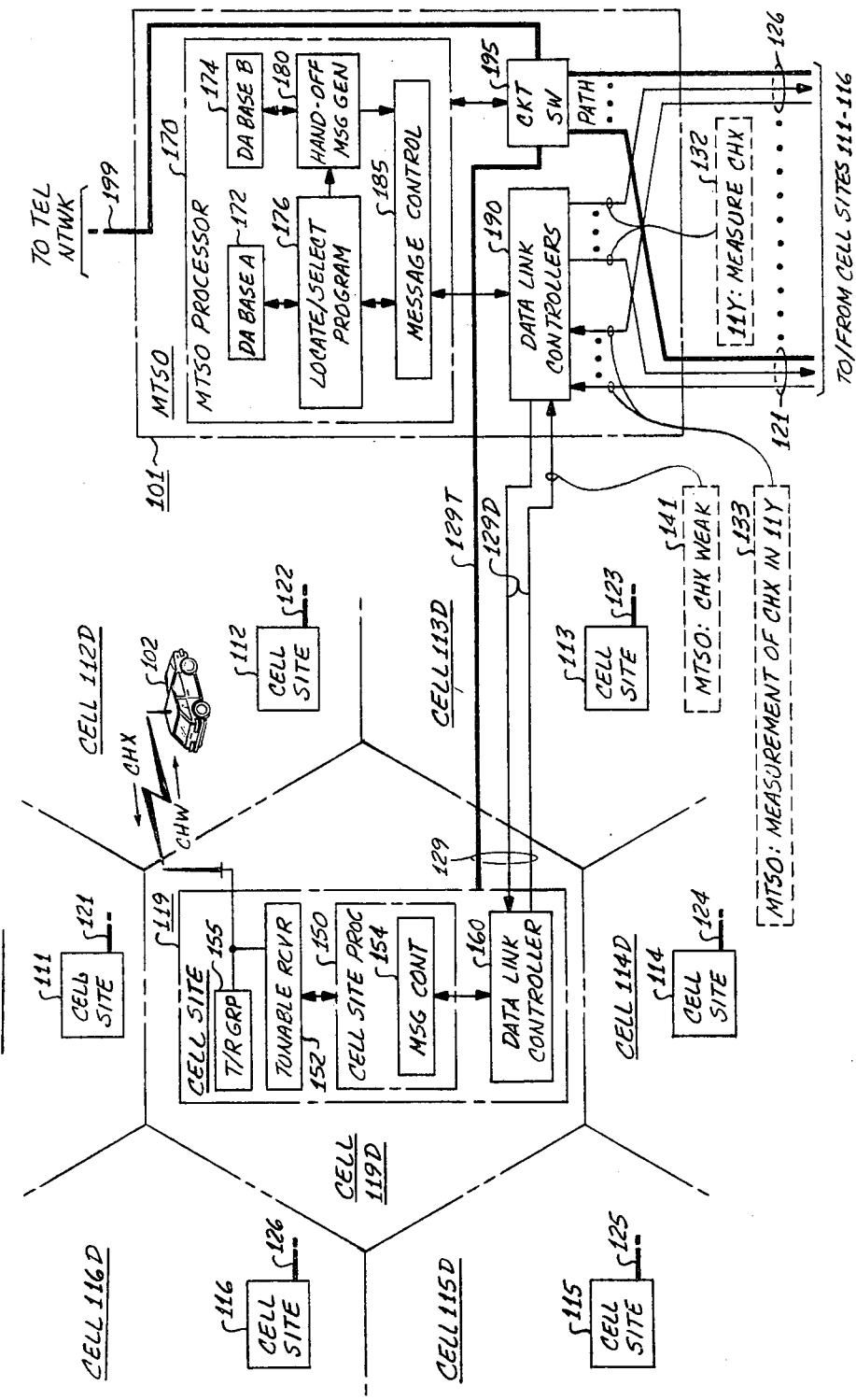
FIG. 1 schematically illustrates a prior art cellular mobile telecommunication system in which the vehicle location process is controlled by the MTSO.

FIG. 1 shows a mobile telecommunications switching office MTSO 101 serving seven cell sites 111, 112, 113, 114, 115, 116, and 119 in a type of prior art cellular mobile telecommunication system described in the aforementioned BSTJ reference. The cell sites are located in cell areas or domains 111D, 112D, 113D, 114D, 115D, 116D, and 119D, respectively. MTSO 101 is connected to the telephone network via transmission facility 199 and to each of the cell sites by a respective two-way data and communication link 121, 122, 123, 124, 125, 126 and 129. MTSO 101 includes a circuit switch 195 to switch among these communication links and between these communication links and the transmission facility 199 connected to the telephone network. Each cell site contains a plurality of radio transmitters/receivers (transceivers), shown as transceiver (T/R) group 155 in FIG. 1, each tuned to transmit to a mobile unit at the frequency associated with a particular transmit radio channel and to receive from that mobile over a corresponding receive radio channel. In addition, each cell has one or more tunable receivers 152 which can be used to measure the signal strength of a received signal associated with any mobile receive channel.

For the sake of simplicity, only one mobile unit 102 is shown. Mobile unit 102 receives signals from cell site 119 over transmit channel CHW and transmits signals to cell site 119 over a corresponding receive channel CHX. The communication is carried to MTSO 101 via transmission facility 129T.

Mobile unit 102 is shown sometime after it has left cell domain 119D and entered into cell domain 112D which is normally served by associated cell site 112. However, mobile unit 102 is still communicating with controlling cell site 119 over transmit/receive channel pair CHW/CHX. At cell site 119, tunable receiver 152 detects a weakened signal from unit 102 and activates message control program 154 of cell site processor 150. When so activated, processor 150 seizes data link controller 160 to send weak signal strength report message 141 over data link 129D to MTSO 101 indicating that the signal received on CHX is below threshold.

At MTSO 101, processor 170, under the control of message control program 185, accepts message 141 and, under the control of locate/select program 176, analyzes message 141. Locate/select program 176 accesses data base A (172) and then generates "Measure CHX" signal strength measurement request messages 132. Under the control of message control program 185, data link controllers 190 send messages 132 to cell sites 111–116. In messages 132, llY represents the identifications of cell sites 111, . . . , 116.

When each of cell sites 111–116 receives its respective signal strength measurement request message 132, it measures the strength of the signal received on channel CHX. Each of cell sites 111–116 then generates and transmits a signal strength report message 133 to MTSO 101. Messages 133 are received at MTSO 101 and analyzed under the control of locate/select program 176 which accesses data base A (172). Locate/select program 176 identifies a potential cell site candidate for a hand-off operation and passes the identification of this candidate to hand-off message generator program 180. This program accesses data base B (174) which contains control data determining availability of individual channels in each cell site. Hand-off message generator program 180 then generates the necessary sequence of messages to effect a hand-off of mobile 102 to another cell site.

Because MTSO processor 170 is involved in controlling data link controllers 190 to receive the weak signal strength report message 141, dispatching the measurement request messages 132, receiving the signal strength report messages 133, and accessing the A and B data bases 172, 174, processor occupancy rises rapidly as more mobile units must be served.

Figure 2:
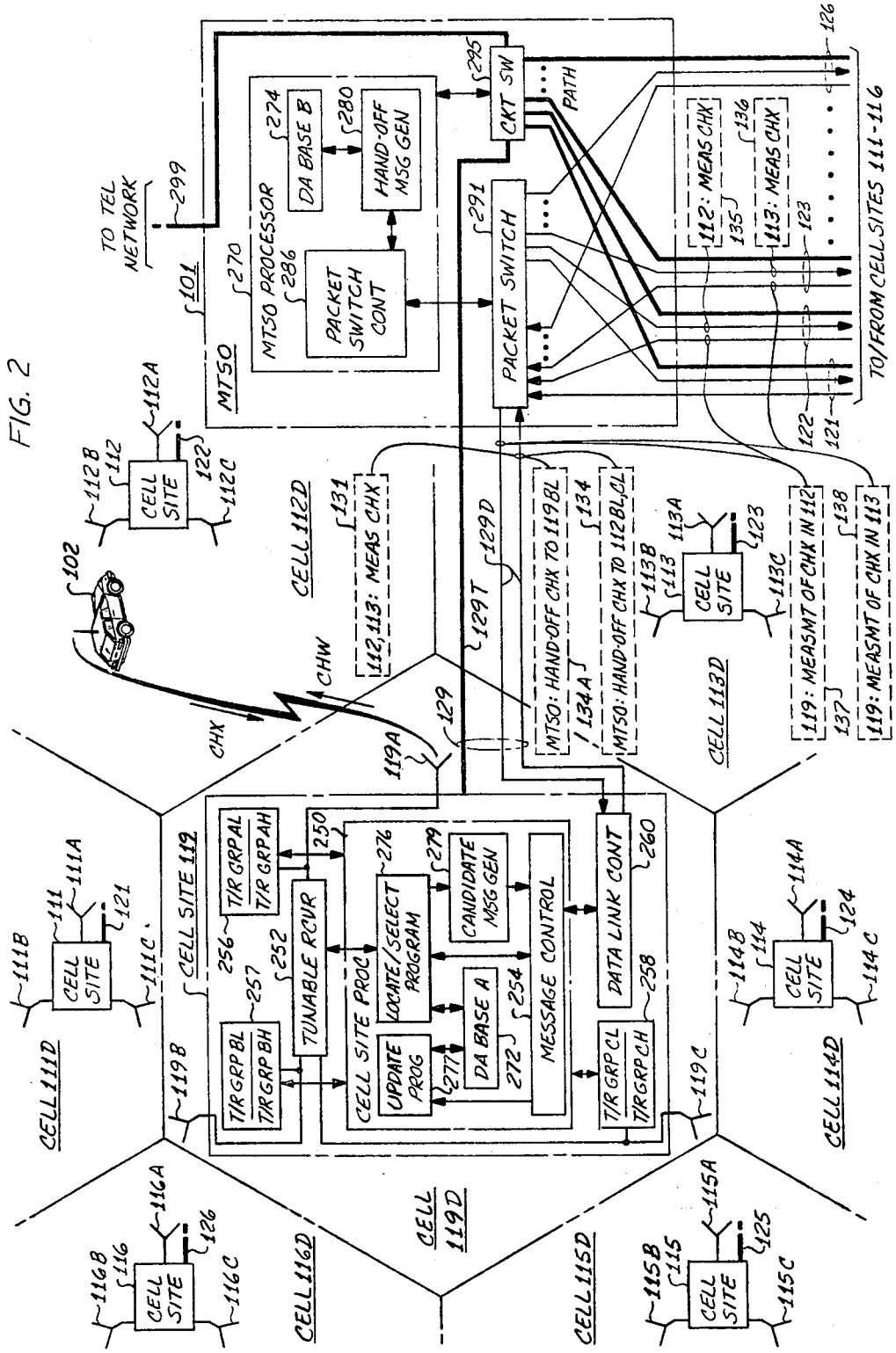
FIG. 2 schematically illustrates a cellular mobile telecommunication system adapted to permit a cell site to control the vehicle location process and to initiate the hand-off process so as to reduce the workload on the MTSO.
Figure 3:
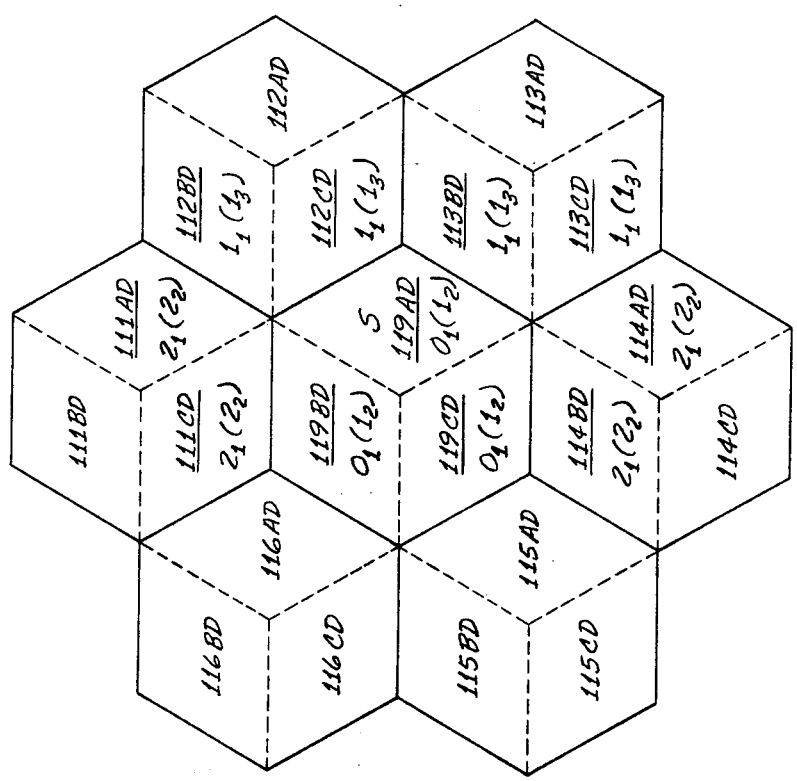
FIG. 3 shows the geographic layout of cells equipped with directional antennas for use in the system of FIG. 2.

FIG. 2 illustrates the changes necessary to implement the present invention which reduces processor occupancy in the MTSO. The system still includes two-way data and communication links 121–126, and 129, and a circuit switch 295 to switch among the communication links, and between the communication links and the transmission facility 299 connected to the telephone network. In FIG. 2, each cell site is advantageously equipped with three directional antennas, shown, for example, as 119A, 119B, and 119C. This allows the system to handle more traffic with a given number of channels. Each antenna illustratively has a beam width of approximately 120 degrees width and covers a preferred sector domain of approximately one-third of the cell area. An example of such cell division is shown in R. H. Frenkiel, U. S. Pat. No. 4,144,411, issued Mar. 13, 1979. The sectors for each cell of FIG. 2 are shown in FIG. 3. For ease of understanding, the sector numbers of FIG. 3 are those of the directional antennas shown in FIG. 2, which serve the sector domain, with the addition of the letter D. For example, cell domain 119D, associated with cell site 119, is partitioned into cell sectors 119AD, 119BD, and 119CD which are served by directional antennas 119A, 119B, and 119C, respectively. Each directional antenna at a cell site has a different associated group of radio channels. Receive channel CHX is associated with one of the transceivers connected to directional antenna 119A covering sector 119AD.

In a system with directional antennas, it is not enough to identify hand-off candidate cell sites; antennas and, more specifically, channel groups for a candidate cell site must also be identified. Some antennas are connected to high power and low power transceivers. These transceivers are in different channel groups, since the channels used by low power transceivers can be reused more frequently than the channels used by high power transceivers. Since a particular antenna may serve more than one channel group, the term antenna/channel groups is used to identify a specific channel group associated with a specific antenna. A candidate list of potential hand-off candidate channel groups in such a system consists of a list of cell site antenna/channel groups. For consistency, the term antenna/channel group is also used for the case in which a cell site has a single antenna and a single channel group associated with that antenna. The invention is also applicable to systems, some or all of whose call sites are equipped with only a single omnidirectional antenna.

In this exemplary system, each antenna/channel group is served by a group of fixed frequency transceivers, each associated with one transmit/receive channel pair, and one communication channel to the MTSO. An antenna/channel group may be used for a communication if one of its transceivers is available. The low power antenna/channel group associated with a particular antenna is referred to in this description by the designation of the antenna followed by an L, e.g., 119AL. The high power antenna/channel group is referred to by the designation of the antenna followed by the letter H, e.g., 119AH. FIG. 2 shows transceiver groups AL, AH (256), BL, BH (257), and CL, CH (258) associated with antenna/channel groups 119AL, 119AH, 119BL, 119BH, 119CL, and 119CH. Within a transceiver group, subgroups of up to eight transceivers are connected to a voice channel controller. This voice channel controller included in boxes 256, 257, and 258, is a microprocessor, used for monitoring and controlling the connected transceivers, and is connected to cell site processor 250.

The vehicle location process for illustrative mobile unit 102 begins when the signal on receive channel CHX drops below a primary threshold. This condition is detected by the voice channel controller. The controller periodically compares the channel's signal strength to the primary threshold. When the signal strength drops below the primary threshold, the condition is reported to cell site processor 250. Before cell site 119 makes a request for measurement by nearby cell sites, it first checks the received signal strength of channel CHX on its own alternate antennas 119A, 119B and 119C as described below. Assume that these measurements indicate an inadequate signal. Locate/select program 276, corresponding to program 176 formerly executed in the MTSO 101 processor 170, is now executed by a cell site processor, such as cell site processor 250 in cell site 119. Data base A (172) of MTSO processor 170, has been partitioned and cell site 119 now contains a respective data base A portion 272. Packet switch 291 has been added to MTSO 101 to convey message data packets among data links 121-126 and 129D to reduce the workload on MTSO processor 270.

As shown, mobile unit 102 communicating over channel CHX has moved into cell domain 112D, and, more specifically, into cell sector domain 112BD, apparently best covered by antenna 112B. Antennas 112C and 111A could also conceivably serve mobile unit 102. Assume that the signal transmitted by the mobile on channel CHX as received by antennas 112B, 112C and 111A are each of adequate strength. The process for forming the list of hand-off candidates, described below in detail with respect to FIGS. 5 and 6, will order these candidate cell sites and channel groups in order 112B and 112C. If no channels are available in antenna/channel groups 112B and 112C and if the channel CHX signal at the serving antenna is below a secondary threshold, an attempt is made to employ secondary group cell site 111.

The processes leading to the generation of data messages will now be discussed in more detail. A weak signal on channel CHX from mobile unit 102 is detected by the voice channel controller connected to the communicating transceiver in 256 of controlling cell site 119. Under the control of locate/select program 276, cell site processor 250 first controls tunable receiver 252 to measure the signal strength of channel CHX as received by cell site 119's directional antennas 119A, 119B and 119C. If the signal strength at antenna 119A is now above primary threshold, that measurement is averaged with the weakened signal as reported by the voice channel controller in 256. The averaging process allows for variations in the signal strength measurement apparatus, and thus permits more precise thresholds to be sent without generating excessive hand-off activity. If this adjusted signal is above primary threshold and is stronger than the signals from the other antennas, the call is retained using CHW/CHX. Otherwise if the received signal strength as thus adjusted, is adequate at one of the other antennas, say antenna 119B, and one of the low power channels associated with that antenna is available, cell site 119 will immediately generate a hand-off request message, 134A, under the control of locate/select program 276 and candidate message generator program 279. This message is sent to MTSO 101 and requests that the mobile currently associated with channel CHX be switched to a channel of antenna/channel group 119B.

If the signal strength of channel CHX at none of the antennas of cell site 119 is adequate, or if no low power channels are available associated with an antenna at cell site 119 receiving adequately strong signals from mobile unit 102, cell site processor 250 recognizes the need for a possible hand-off of communication with mobile 102 to another cell site. Cell site processor 250, under the control of locate/select program 276, consults its local cell site data base A 272. Cell site processor 250 prepares and, under the control of message control program 254, transmits message 131 over two-way data link 129D to the packet switch 291. Message 131 commands members of a list of nearby cell sites, stored in data base A, to measure the signal strength received on channel CHX. Packet switch 291 forwards the text of message 131 as messages 135, 136 to each cell site on the list of destinations 112, 113 included in message 131. The sending of a single message to packet switch 291 reduces the data processing load of cell site processor 250, reduces the traffic over data link 129D, and reduces the data processing load of packet switch control program 286.

Each cell site maintains channel availability data for each of its antenna/channel groups, as described further below with respect to FIG. 4, block 590. Every time a channel is seized or released, update program 277, responsive to seize or release messages (not shown) from message control 254, updates data base A (272) to reflect the change in availability of channels in the associated group.

Each of the cell sites 112, 113 upon receiving message 135, 136 makes measurements of the strengths of the signal received by each of its antennas from channel CHX and determines channel availability for each of its antenna/channel groups. Each of these cell sites 112, 113 then transmits its measurement data and corresponding channel availability data in a message 137, 138, which is returned via packet switch 291 to cell site 119.

As each message 137, 138 is received at cell site 119, the measurements are compared under the control of locate/select program 276 against corresponding threshold data stored in data base A (272) of cell site processor 250. Locate/select program 276 generates an ordered list of antenna/channel group candidates for the hand-off of this mobile call. Candidate message generator program 279 then generates message 134, a hand-off request message containing an ordered list of hand-off candidate cell sites and antenna/channel groups, which is sent over data link 129D to MTSO 101.

In MTSO 101, hand-off message generator program 280 receives message 134 and generates the message sequence (not shown), directed to cell sites 119 and the new controlling cell site, necessary to effect a hand-off. The hand-off message sequence and the subsequent actions by the cell sites and mobile unit are essentially the same as those for the prior art system described in the BSTJ articles cited above.

DETAILED DESCRIPTION

FIG. 3 is a geographic layout and state diagram showing how data base A (272) "views" the cell site 119's surrounding cell sites 111-116, for the purposes of generating an ordered list of hand-off candidates of antenna/channel groups. Each cell site sector is marked to denote the appropriate areas best served by a corresponding one of the directional antennas.

Antenna/channel groups are formed into an initial or zeroeth group, and a first and second group. The first and second groups are further divided into subgroups. A candidate list of antenna/channel groups is an ordered list of such antenna/channel groups, the ordering being by group and subgroup. Within a subgroup, candidate antenna/channel groups are ranked in order of decreasing measured signal strength compared to the threshold associated with each antenna/channel group. In FIG. 3, group numbers are coefficients, subgroup numbers are subscripts, numbers outside parentheses refer to low power antenna/channel groups serving a sector domain, those in parentheses the high power antenna/channel groups serving a sector domain.

The choice of grouping is influenced by the direction of the current location of the mobile unit 102. This direction can be inferred from the initial measurements of signal strength at the controlling cell site 119. The mobile unit is likely to be in the direction covered by the controlling cell site directional antenna currently receiving the strongest signal from the mobile unit. In this example, the strongest signal is received on antenna 119A, and the state diagram of FIG. 3 applies to the case of strongest signal received on antenna 119A. Similar state diagrams and data bases can readily be inferred for the case of strongest signal received on antenna 119B or antenna 119C.

In this example, FIG. 3 shows that the low power antenna/channel groups associated with the serving cell site sectors 119AD, 119BD, and 119CD are each designated "$0_1$". The low power antenna/channel groups associated with cell site sectors 112BD, 112CD, 113BD, and 113CD are each designated "$1_1$". The high power antenna/channel groups associated with the serving cell sectors 119AD, 119BD, and 119D are designated "$(1_2)$". The high power antenna/channel groups associated with cell site sectors 112BD, 112CD, 113BD, and 113CD, are designated "$(1_3)$". The low power antenna/channel groups associated with cell site sectors 111AD, 111CD, 114AD, and 114BD form are designated "$2_1$". The high power antenna channel groups associated with 111AD, 111CD, 114AD, and 114BD are designated "$(2_2)$".

Figure 4:
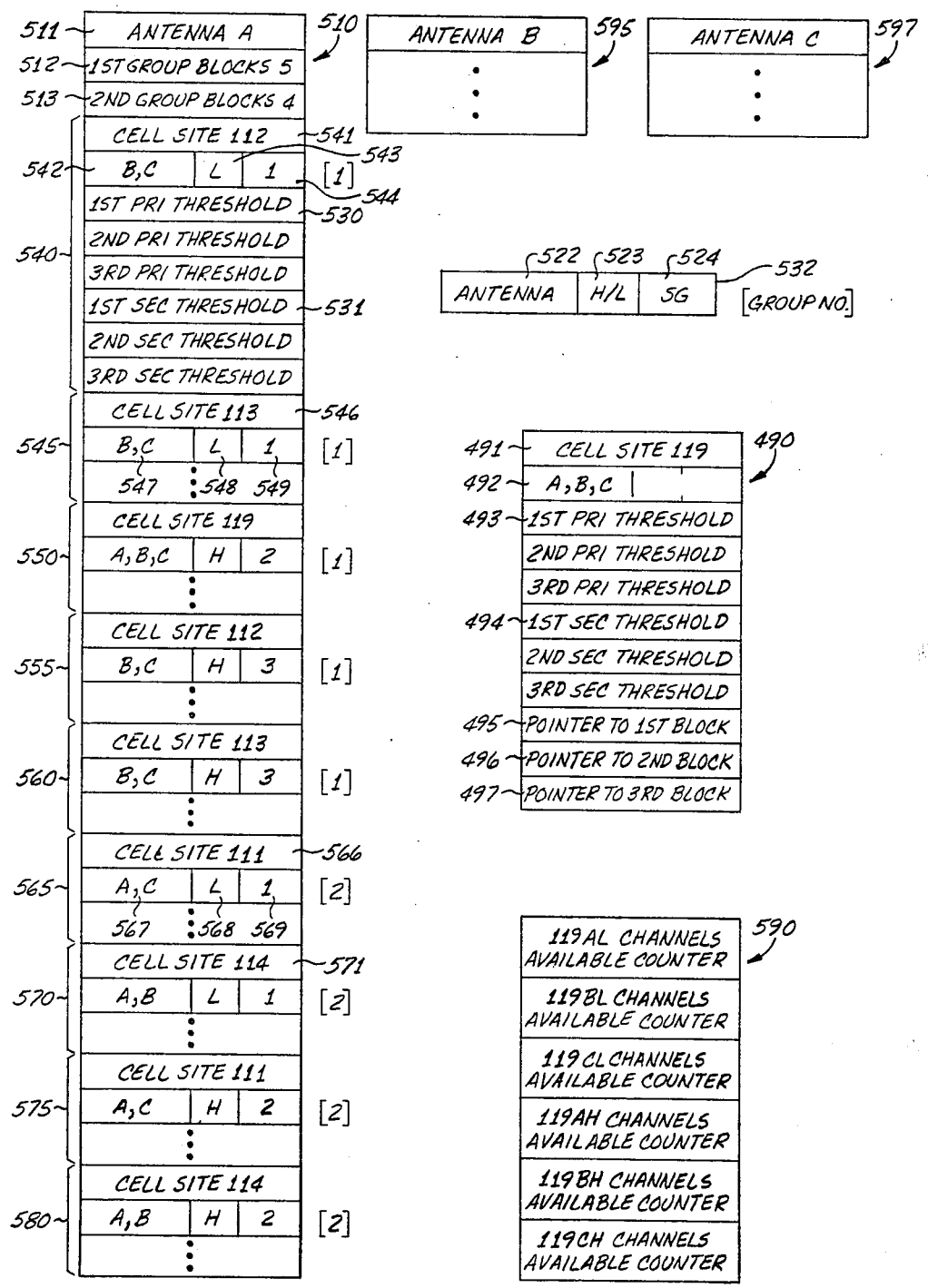
FIG. 4 is a layout of a cell site data base.

The detailed data base A (272) entries required to support the candidate selection process are shown in FIG. 4. Block 490 contains the initial data required for processing the initial measurements at the controlling cell site. Byte 491 identifies the cell site and byte 492 indicates which directional antennas are equipped. Bytes 493 and 494 specify the primary and secondary signal strength thresholds associated with the first, i.e., the A antenna. Equivalent bytes are also provided for the B and C antennas. Data concerning nearby cell sites and high power antenna/channel groups in the controlling cell site is stored in one of three blocks 510, 595, and 597. When the antenna with the strongest signal has been identified, one of these blocks is accessed via a respective one of the three pointers 495, 496 or 497.

Block 510 shows the layout of data required for storing antenna/channel grouping and signal strength threshold data for the case of a mobile whose strongest signal strength measurement is from antenna 119A, identified in byte 511. Each of the blocks 540, 545, 550, 555, 560, 565, 570, 575, and 580 stores data associated with either the high or the low power antenna/channel groups of one cell site. Byte 512 and 513 specify the number of blocks in the first and second group, respectively.

Typical block 540 shows the data for the low power antenna/channel groups 112BL and 112CL of cell site 112. The cell site is identified in byte 541. Box 532 is a descriptive layout of the second byte of each of the blocks such as block 540 and indicates that this byte contains three fields. Fields 522, 523, and 524 identify the use of the specific data entries 542, 543, and 544 in typical block 540. Field 522 specifies which of the four antennas have an associated channel group of the correct power level which is a potential hand-off candidate. For block 540, this is antennas B and C (542). Field 523 specifies whether this block pertains to the high or low power channel group. Block 540 pertains to the low power channel group, hence the L in 543. Field 524 specifies a subgroup number, hence the data 1 in 544. The group number, 1, is deduced from the fact that block 540, is one of the first 5 blocks, the number 5 being specified by byte 512, hence the bracketed 1 shown next to field 544. These entries in block 540, associated with antenna channel groups 112BL and 112CL, correspond to the "$1_1$" shown in FIG. 3 in sector 112BD and 112CD.

Similarly, the entries in block 545 correspond to antenna/channel groups 113BL and 113CL. Byte 546 identifies the cell site 113, field 547 identifies the B and C antennas, field 548 identifies the low power channel groups, the bracketed 1 next to field 549 indicates the group which is supplemented by the subgroup 1 in field 549. The contents of block 545 therefore correspond to the "$1_1$", shown in sectors 113BD and 113CD of FIG. 3. In a similar way, block 550, pertains to the high power antenna/channel groups of cell site 119, shows that A, B and C antennas can be used, and shows that these channel groups are in the second subgroup of group 1. This corresponds to the "($1_2$)" in sectors 119AD, 119BD and 119CD of FIG. 3.

Skip now to block 565, the sixth block. This is the first block associated with the second group of antenna channel groups, hence the bracketed 2 next to field 569. The cell site 111 (byte 566), antennas A and C (field 567), low power channel groups (field 568) and first subgroup (field 569) are all specified in the block. This corresponds to the "$2_1$", shown in sectors 111AD and 111CD of FIG. 3. The rest of the entries in block 510 similarly correspond to the state diagram data of FIG. 3.

Each block 540, 545, . . . , 575, 580 also stores primary and secondary thresholds associated with each of up to three antennas per block. These are shown in block 540 in exemplary bytes 530 and 531.

Block 590 stores availability indicator for the antenna/channel groups of cell site 119. The indicator for each antenna/channel group is simply an up/down counter, initialized to the number of channels of an antenna/channel group, decremented whenever a channel is seized, and incremented whenever a channel is released. A positive count indicates that a channel of a group is currently available; a count of zero indicates that all channels are busy.

A hand-off candidate list is generated by locate/select program 276 based on the grouping of antenna/channel groups described above, on measurement data received at the controlling cell site, and on thresholds stored as described above. Acceptable candidates within a subgroup are arranged in order of the excess of the measured signal strength compared to the stored threshold. Candidates are added to a candidate list until the list is "complete". The candidate list is complete when it contains an available candidate, i.e., an antenna/channel group associated with an acceptable signal strength measurement and a reported available channel, or when the list contains three candidates with acceptable signal strength measurements, whichever happens first. The number three was chosen as a reasonable maximum since the number of nearby cell site antennas which could handle a mobile that has wandered in any given direction from a controlling cell site sector is likely to be small.

Figure 5:
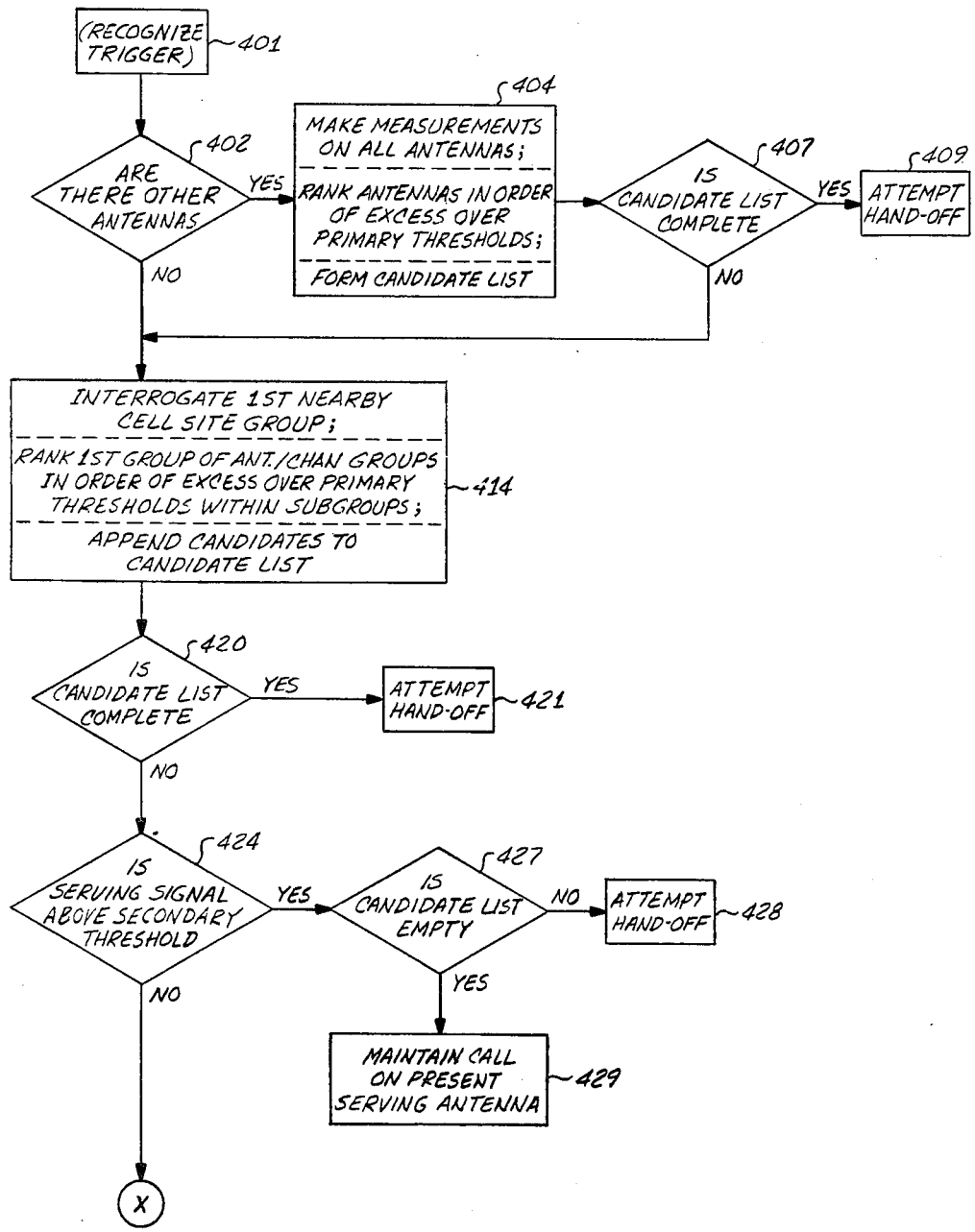
FIGS. 5 and 6 are flow charts of the process controlling the generation of the list of candidate facilities to be included in the data message for call hand-off.
Figure 6:
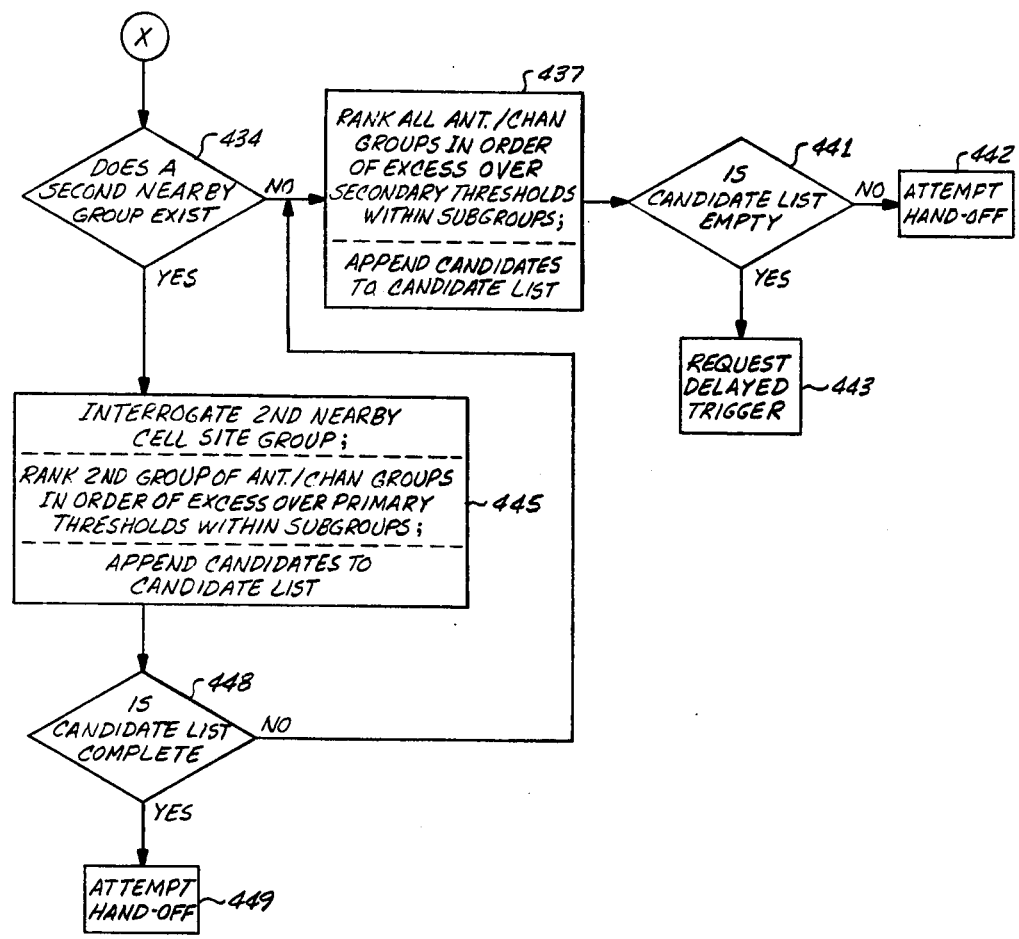

The details of the candidate selection process of FIG. 5 will now be described. When the voice channel controller in 256 detects that a received signal has dropped below the primary threshold, it notifies processor 250. This triggers process step 401 causing a test 402 to access data base A 272 to determine if the cell site has other (directional) antennas. If not, the group 1 cell sites are immediately queried; the serving cell site is, effectively, a group 1 cell site. If so, process 404 measures the signal strength on all antennas of the serving cell site. As previously mentioned, the signal strength measurement on the serving antenna is averaged with the signal strength measurement from the voice channel controller. If the measured signal strength on any antenna exceeds the primary threshold, the associated antenna/channel group is entered on a candidate list to be examined by test 407 in order of excess above primary threshold.

A candidate list is "complete" for the limited purposes of test 407 if a candidate with an available channel has been found in an alternate low power antenna/channel group. In that case, process 409 generates a hand-off request message 134A (FIG. 2). If the adjusted measured signal from the serving antenna was strongest, process 409 will simply allow the call to be retained on the serving antenna using the serving transceiver and channels. Otherwise, process 414 generates measurement request message 131 (FIG. 2), directed to the first group of nearby cell sites. This process will also cause the serving cell site to make a signal strength measurement if it has only one antenna. Message 131 is sent to packet switch 291 at MTSO 101 which forwards the request to the group of cell sites identified in bytes 541 and 546 of FIG. 4. Each signal strength report message 137, 138 returned from this first group of nearby cell sites is compared in process 414 with the corresponding primary thresholds such as byte 530 (FIG. 4) for each directional antenna of the replying cell sites. Candidate antenna/channel groups with received signal strength above corresponding primary threshold are added to the candidate list.

When test 420 detects that process 414 has generated a complete candidate list process, 414 is terminated and process 421 generates a hand-off request message 134 to MTSO 101. If process 414 is completed and test 420 finds that the candidate list is not complete, process 424 tests whether the signal at the serving cell site and antenna is above a secondary threshold. If so, process 427 tests whether the candidate list is empty. If the list is not empty, process 428 generates a hand-off request message 134 to MTSO 101. Otherwise, process 429 maintains the call on the present serving antenna and channel. Subsequently, in about five seconds, the voice channel controller in 256 (FIG. 2) may again detect that the received signal has dropped below the primary threshold, thus triggering process step 401 once more.

If test 424 indicates that the signal level at the serving cell site has dropped below the secondary threshold, a test 434 (FIG. 6) is made to see if a second nearby cell site group exists. If so, process 445 causes a second measurement request message 131 (FIG. 2) to be sent, this one directed to the second group of cell sites. The second group of cell sites is identified by bytes 566 and 571 (FIG. 4).

After signal strength report messages from the second group of cell sites have been received, process 445 generates a list, subgroup by subgroup, for all antenna/channel subgroups in the second candidate group whose signal strength is above the primary threshold. Process 448 makes a test for completeness of the list, and if a complete candidate list has been generated, process 449 generates a hand-off request message 134 which is sent to MTSO 101. If process 448 fails to find a complete list, it calls for the execution of process 437. Process 437 generates an ordered candidate list based on signals exceeding the secondary thresholds in both groups of antenna/channel groups. Process 437 is also executed directly if test 434 indicates that no second nearby cell site group exists. If test 441 finds that the candidate list generated by process 437 is not empty, process 442 generates a hand-off request message 134 which is sent to the MTSO 101. If test 441 finds the candidate list generated by process 437 is empty, test 441 causes process 443 to insert a delay which will defer another attempted hand-off for a period substantially greater than the normal five seconds.

Figure 7:
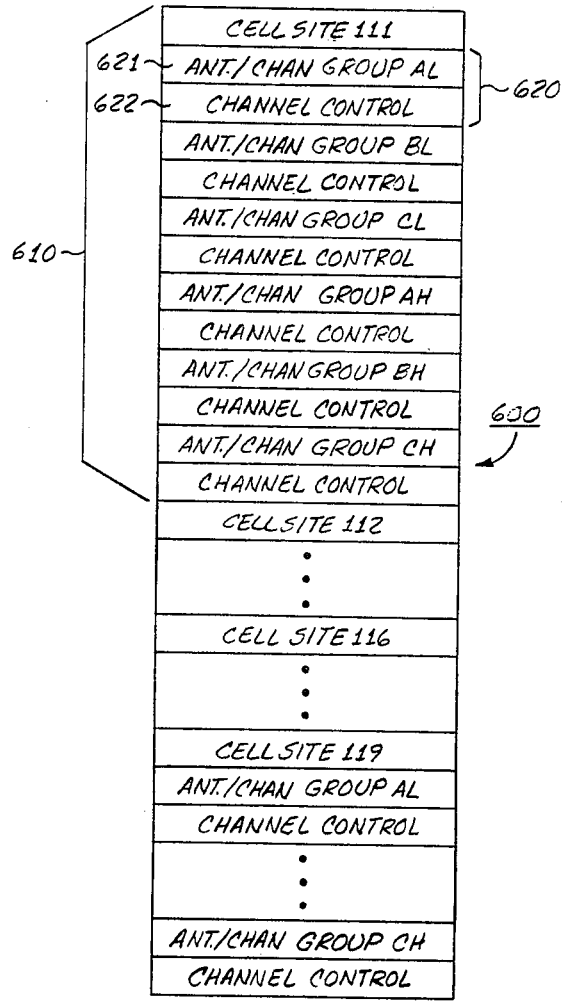
FIG. 7 is a layout of an MTSO data base.

FIG. 7 shows the layout of data base B 274, shown as block 600, maintained at MTSO 101. The data base is essentially the same as data base B 174 of FIG. 1, except that it contains data for a much larger number of antenna channel groups. This data base contains centralized control information used for the assignment of channels. The block of data 610 for cell site 111 is shown in detail. It contains a section of data such as subblock 620 for each antenna/channel group. Location 621 contains the identity of the antenna/channel group of section 620, and section 622 contains channel control data for each channel of the group. The control data 622 specifies which channels of the group are available. The members of a candidate list are examined in order by MTSO 101 to see if a channel is available on one of the antenna/channel groups on the list.

If a channel is available, hand-off message generator process 280 (FIG. 2) generates the hand-off message sequence to transfer the call to that channel. Packet switch control process 286 controls packet switch 290 which transmits the hand-off message sequence to the controlling cell site and the cell site which is to take over the call.

Figure 8:
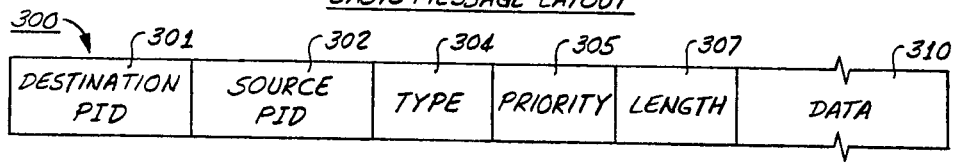
FIGS. 8 and 9 show the layout of data messages used in the system of FIG. 2.
Figure 9:
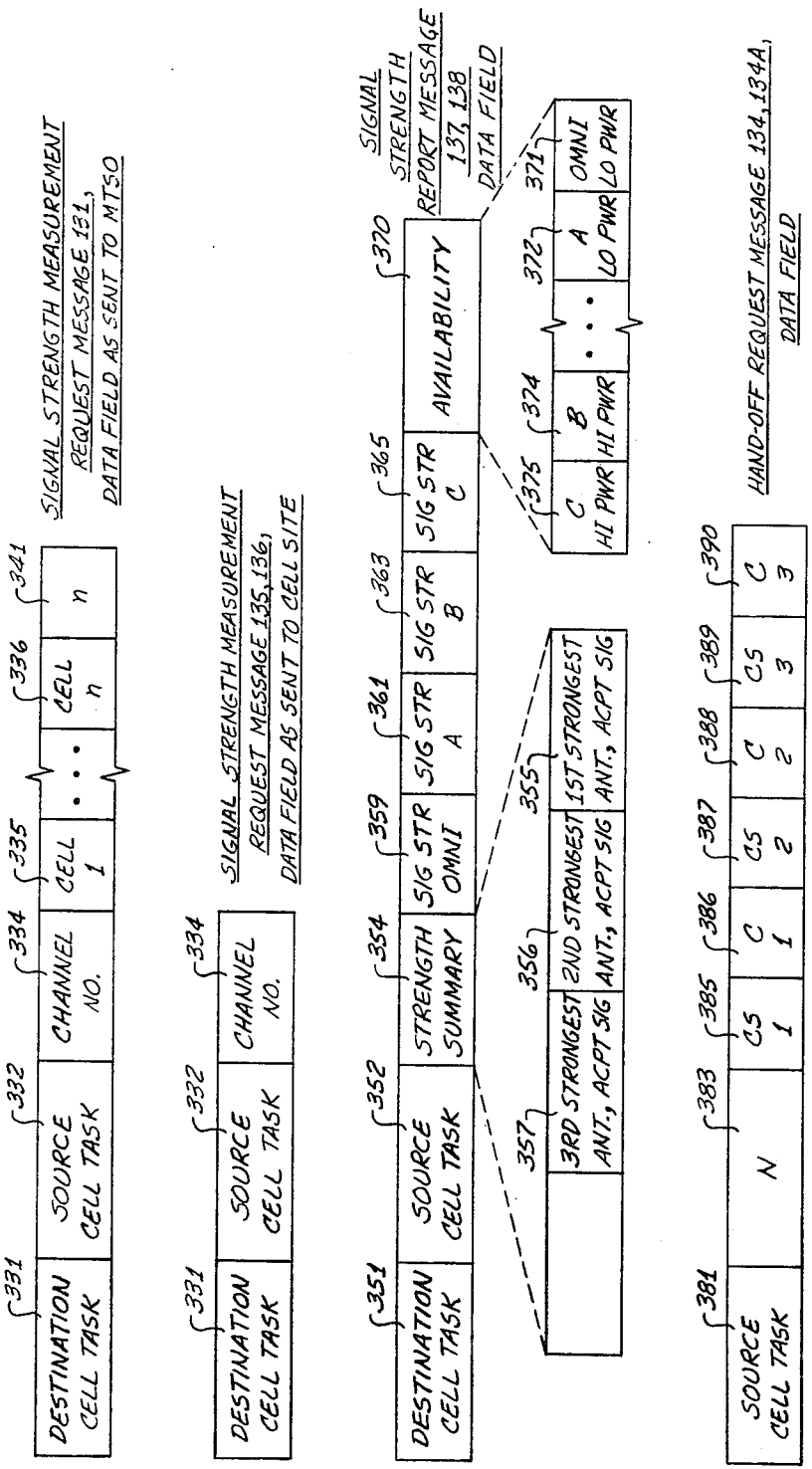

FIGS. 8 and 9 show the layout of signal strength measurement request messages 131, 135, 136, signal strength report messages 137, 138, and hand-off request messages 134, 134A. The messages have been arranged in this system to allow standard types of items to be recognized and treated in a uniform manner. Each message includes a 12 byte header 300 (FIG. 8), optionally followed by a variable length data field 310. The first four bytes 301 of each header comprise a destination process identifier. The process identifier is used to refer the message to the MTSO or the appropriate cell site and to the appropriate program process. The next four bytes 302 convey similar information about the source process. In case a source and destination process communicate with each other in both directions, this arrangement makes it possible to interchange the source and destination process identifiers when preparing the header of a response message.

The ninth and tenth bytes 304 of the header indicate the type of message. These bytes are examined first by packet switch control program 286 or the cell site message control program 254 (FIG. 2), in order to process other data in the message appropriately. Illustrative message types are signal strength measurement request, signal strength report, and hand-off request. The eleventh byte 305 indicates the priority of the message and is not further described herein. The twelfth byte 307 indicates the length in bytes of the subsequent data of the message data field 310.

The detailed layout of the data field (FIG. 9) of a signal strength measurement request message 131 (FIG. 2) will now be described. The first byte 331 is an identification of the receiving (i.e., measuring) cell site task. The second byte 332 of the data field contains an identification of the requesting (i.e., control) cell site task. The next two bytes 334 contain the channel number for which the measurements are to be taken. Finally, the message to MTSO 101 includes a list 335, . . . , 336 of the destination cell sites followed by the number 341 of these cell sites. List 335, . . . , 336 and number 341 are not transmitted to these cell sites. In the signal strength measurement request message 131, the data field length (field 307) is 5+n:4 bytes for the destination cell task, source cell task and channel number which will be transmitted from the MTSO to each of the cell sites which are to make measurements; 1 byte to indicate n, the number of cell sites, to be queried; and n bytes to specify the individual cell sites.

Signal strength measurement request messages 135, 136 are commands to the receiving cell site that they perform signal strength measurements. Messages 135, 136 contain the 12 byte header (fields 301, 302, 304, 305, 307) and the first four bytes of the data field (fields 331, 332, 334) of message 131. When packet switch 291 receives message 131, control program 286 checks the type field 304 and recognizes that the first 16 bytes of the message are to be forwarded to each cell site on the list. Packet switch 291 initializes byte 307 to four, the number of bytes in the data field of messages 135, 136. Packet switch 291 then transmits signal strength measurement request messages 135, 136 to each of the cell sites on the list of message 131.

Signal strength report messages 137, 138 are generated by a cell site in response to the reception of a signal strength measurement request message 135, 136. A cell site, upon receiving a message 135 or 136, makes measurements of the received signal strength of the appropriate channel, indicated in the fifteenth and sixteenth bytes (field 334) of the signal strength measurement request message. A cell site equipped with directional antennas will make these measurements on each directional antenna. In signal strength report messages 137, 138 the source 301 and destination 302 process identification fields contained in the first eight bytes of the header of the signal strength measurement request message are simply interchanged. The type field 304 is appropriately set to indicate a signal strength report message and the length 307 is set to a standard value of eight. The first two bytes 351 and 352 of the data field of message 137, 138 are reversed from bytes 331 and 332 of the received signal strength measurement request message 135, 136 and now identify the task in the controlling and the measuring cell site, respectively.

In signal strength report message 137, 138, one byte 354 is provided to indicate the order of strength of received signals from each of the three directional antennas. For convenience, the numbers 1, 2, and 3 represent the A, B and C directional antennas, respectively. If the received signal on one of these antennas is not sufficiently strong or the antenna is unequipped, a 0 is indicated. Byte 354 consists of three numbers 355, 356, and 357, each between 0 and 3. The first number 355 represents the directional antenna with the strongest received signal if it is above threshold, the second number 356 represents the directional antenna with the second strongest signal if it is above threshold, and the third number 357 represents the directional antenna with the third strongest signal if it is above threshold.

Next, the signal strength of channel CHX received in an omnidirectional antenna, and the A, B, and C antennas are indicated in standard locations 359, 361, 363, and 365 in the next four bytes.

Finally, the last byte 370 indicates availability of channels in each of the eight possible groups associable with a cell site. This information is conveyed in a standard pattern even though few or no cell sites will have all eight groups. These eight possible groups represent four possible groups associated with a low power transmitted signal on each of the three directional antennas and an omnidirectional antenna, plus four groups associated with a high power transmitted signal associated with each of these four possible antennas. Within byte 370, bit 371 represents availability of a low power channel on the omnidirectional antenna, bit 372 represents availability of a low power channel on the A antenna, ..., bit 374 represents availability of a high power channel on the B antenna, and bit 375 represents availability of a high power channel on the C antenna.

The signal strength report messages 137, 138 are sent from the various cell sites which have been requested to measure the signal intensity of channel CHX back to packet switch 291 and are then forwarded to the controlling cell site. The controlling cell site uses the destination cell task identifier 351 to associate the reports with channel CHX. The controlling cell site takes these measurements and, on the basis of the groupings of antenna/channel groups as stored in block 510 (FIG. 4), the relative signal strength compared to a stored threshold, and the availability of channels, generates an ordered list of candidate antenna/channel groups, as previously described with respect to FIGS. 5 and 6.

The hand-off request message, such as message 134 (FIG. 2) has a data field format shown in FIG. 9. The message consists of a header, including source and destination process identifiers and the type of message, and a length of 4, 6, or 8 bytes depending on whether the candidate list is 1, 2, or 3 entries long. The data field includes the controlling cell site task number in the first byte 381, the number of entries in the second byte 383, and groups of two bytes (385, 386; 387, 388; 389, 390) indicating the cell site number and antenna/channel group (i.e., directional antenna identification plus a high or low power channel group identifier) for each of the candidates on the list. The controlling cell site task number identifies channel CHX to the MTSO. Hand-off message generator 280 in the MTSO uses this candidate list to find available channels and associated transceivers, accessing data base B 274 to check on channel availability. When an available channel is found, hand-off message generator program 280 generates the conventional hand-off message sequence essentially in the same way as is done in the prior system.

Because only the type field of a received message need be examined and the message can be readily forwarded to one or a plurality of destinations, less usage is made of the MTSO data processing resources in the system of FIG. 2 than in the system of FIG. 1. The more complex and time consuming locate/select program functions are carried out in the cell site. Thus, moving control of the vehicle location process to the controlling cell site substantially deloads the MTSO processor, especially during periods of peak traffic.

In the exemplary system which has been described, no direct data links were shown among cell sites, all messages being sent via the MTSO acting as a message switch. In alternate configurations, it should be appreciated that it may be more economical to provide a limited number of direct data links between selected cell sites or to provide alternate facilities for data switching messages among cell sites and the MTSO.

It is well-known that in hilly terrain, radio signal propagation patterns are irregular. In order to handle unusual situations, it may be desirable under some circumstances to select the nearby cell sites on the basis of the currently serving antenna instead of the antenna with the strongest received signal. Also, it may be desirable for certain cell sites to hand-off only to the antenna/channel groups associated with the strongest received signal. The changes necessary to the system as described in order to implement such functions are quite straightforward. Note further that the described process for selecting a hand-off antenna/channel group, based on measurements, thresholds, grouping and subgrouping can also be implemented in the MTSO if desired, and represents by itself an improved process for making such a selection. Mobile units can be mounted in vehicles or can be portable.

It is to be understood that the above-described embodiment is merely illustrative of the principles of this invention; other arrangements may be devised by those skilled in the art without departing from the spirit and scope of the invention.

What is claimed is:

1. In a plural channel mobile communication system for serving mobile units from a plurality of cell sites each equipped with signal strength measuring apparatus and each having one or more antenna/channel groups, a method for transferring control of communications with a mobile unit from one antenna/channel group of one cell site to another antenna/channel group, comprising the steps of:
   storing in a local cell site data base at each of said cell sites a list of nearby cell sites and a list of candidate hand-off antenna/channel groups and associated signal strength thresholds;
   ascertaining at said one cell site when the signal strength of said mobile unit drops below a prespecified threshold;
   responsive to said signal strength ascertaining step, accessing the local cell site data base at said one cell site to obtain said list of nearby cell sites and transmitting a command to said signal strength measuring apparatus of said nearby cell sites to measure and report the signal strength of said mobile unit;
   responsive to the receipt of said reports from said signal strength measuring apparatus, selecting from said accessed data base candidate list those antenna/channel groups associated with signal strength reports above said associated signal strength threshold.

2. The method of claim 1 further comprising the steps of:
   storing in said local cell site data base at each of said cell sites indications as to the availability of each of said antenna/channel groups;
   responsive to said signal strength command, accessing said data base to ascertain said antenna/channel group availability; and
   controlling said selecting step in accordance with said ascertained antenna/channel group availability.

3. The method of claim 2 further comprising the steps of:
   further responsive to the receipt of said reports from said signal strength measuring apparatus, measuring said signal strength at a second group of said cell sites; and
   selecting an antenna/channel group in said second group having a measured signal strength above said associated signal strength threshold.

4. The method of claim 2 further comprising the steps of:
   storing in said local cell site data base at said one cell site a second list of nearby cell sites and candidate hand-off antenna/channel groups with associated signal strength thresholds;

ascertaining at said one cell site when the signal strength of said mobile unit drops below a further prespecified threshold;

responsive to said ascertaining at said signal strength having fallen below said further threshold, accessing said local cell site data base at said one cell site to obtain said second list of nearby cell sites and transmitting a command to said signal strength measuring apparatus of said second nearby cell sites to measure and further report the signal strength of said mobile unit;

responsive to the receipt of said further report from said signal strength measuring apparatus, selecting from said second candidate list those antenna/channel groups associated with signal strength reports above said associated signal strength threshold.

5. The method of claim 1 in which said storing step comprises the step of:

storing in a local cell site data base at each of said cell sites a plurality of lists of nearby cell sites and a corresponding plurality of lists of candidate antenna/channel groups and associated signal strength thresholds, said plurality corresponding to a plurality of directional antennas at said one cell site;

in which said ascertaining step further comprises the step of measuring which one of said plurality of directional antennas is receiving the strongest signal from said mobile unit; and in which said accessing step comprises the step of accessing the local data base at said one cell site to obtain one of said plurality of lists of nearby cell sites corresponding to said one of said plurality of directional antennas receiving the strongest signal from said mobile.

6. In a mobile communication system having a plurality of antenna/channel groups for serving mobile units from a plurality of cell sites connected to a telephone switching office and having signal strength measuring apparatus, means for transferring control of communications with a mobile unit from one of said antenna/channel groups at one of said cell sites to another antenna/channel group, comprising:

means for storing a list of nearby cell sites in a data base local to said one of said cell sites;

means for ascertaining at said one of said cell sites when the signal strength of said mobile unit drops below a predetermined value;

means responsive to said ascertaining means for accessing said stored list to formulate a packetized message including an address directed to each of said nearby cell sites, said message including a command to said signal strength measuring apparatus to measure said signal strength of said mobile unit.

7. The mobile communication system of claim 6 wherein said means for formulating said packetized message includes means for including a report command to cause said measuring apparatus to report said signal strength of said mobile unit to said one of said cell sites.

8. The mobile communication system of claim 7 further comprising packet switching means responsive to said addresses to forward said message to each of said addressed cell sites and for forwarding said report from each of said cell sites to said one cell site.

9. The mobile communication system of claim 8 further comprising means for storing indications of the availability of antenna/channel groups at said cell sites and further comprising means responsive to said report command for generating a signal strength report and for appending said availability indications to said signal strength report.

10. The mobile communication system of claim 9 wherein said means for storing further comprises means for storing a list of candidate hand-off antenna/channel groups with associated prespecified signal strength thresholds, further comprising means responsive to the receipt of said signal strength reports from each of said nearby cell sites for accessing said local cell site data base to obtain said candidate antenna/channel group list and for comparing each of said reports against said associated prespecified signal strength thresholds for each of said candidate antenna/channel groups.

11. The mobile communication system of claim 10 further comprising means controlled by said comparing means for eliminating from said candidate list any channel groups associated with signal strength reports below said associated prespecified signal strength threshold, and for terminating said candidate list when an antenna/channel group associated with a reported available channel is entered on said candidate list; and means for formulating a packetized message addressed to said telephone switching office including said antenna/channel groups remaining in said candidate list.

12. The mobile communication system of claim 8 wherein said means for storing further comprises means for storing a list of candidate hand-off antenna/channel groups with associated prespecified signal strength thresholds, and further comprising:

means responsive to the receipt of said signal strength reports from each of said nearby cell sites for accessing said data base to obtain said list of candidate hand-off antenna/channel groups and for comparing each of said reports against said associated prespecified signal strength thresholds for each of said candidate antenna/channel groups.

13. The mobile communication system of claim 12 further comprising means controlled by said comparing means for eliminating from said candidate list any antenna/channel groups associated with signal strength reports below said associated prespecified signal strength threshold, and means for formulating a packetized message addressed to said telephone switching office including said antenna/channel groups remaining in said candidate list.

14. The mobile communication system of claim 6 in which said means for storing a list of nearby cell sites comprises means for storing a plurality of lists of nearby cell sites, said plurality corresponding to a plurality of directional antennas at said one cell site;

in which said means for ascertaining comprises means for measuring which one of said plurality of directional antennas is receiving the strongest signal from said mobile unit; and in which said means for accessing said stored lists comprises means for accessing one of said plurality of lists corresponding to said one of said plurality of directional antennas receiving the strongest signal from said mobile unit.

15. In a mobile communication system for serving a multiplicity of mobile units from a plurality of cell sites each equipped with signal strength measuring apparatus and adapted to process mobile unit signal strength measurements to generate a message including a hand-off candidate list of cell sites and associated channel groups, a method for transferring control of communications with a mobile unit from one cell site to another, comprising the steps of:

storing in a control data base state indicators specifying which channels are available for use at said cell sites;

responsive to reception of said message including a hand-off candidate list, selecting one of said available channels associated with a member of said candidate list, using said control data base to determine availability; and transmitting a hand-off message sequence including the identification of said selected available channel.

16. The method of claim 15 further comprising the steps of:

receiving a measurement request message from said one of said cell sites;

responsive to reception of said measurement request message, transmitting a second measurement request message to predetermined ones of said cell sites;

receiving a report message from each of said predetermined ones of said cell sites; and responsive to reception of each of said report messages, forwarding each of said report messages to said one of said cell sites.

17. In a plural channel mobile communication system for serving mobile units from a plurality of cell sites each equipped with signal strength measuring apparatus and each having one or more antenna/channel groups, a method for transferring control of communications with a mobile unit from one antenna/channel group at one cell site to another antenna/channel group, comprising the steps of:

storing in a local cell site data base at each of said cell sites first and second lists of nearby cell sites and first and second lists of candidate hand-off antenna/channel groups and associated primary and secondary signal strength thresholds;

first ascertaining at said one cell site when the signal strength of said mobile unit drops below a primary prespecified threshold;

responsive to said signal strength ascertaining step, accessing said local cell site data base to obtain said first list of nearby cell sites and transmitting a first command to said signal strength measuring apparatus of said nearby cell sites on said first list to measure and report the signal strength of said mobile unit;

responsive to the receipt of said reports from said signal strength measuring apparatus of said nearby cell sites on said first list, selecting from said accessed data base first candidate list those antenna/channel groups associated with signal strength reports above said associated primary signal strength threshold;

responsive to said first selecting step, if said first selecting step selects no antenna/channel groups, further ascertaining at said one cell site whether the signal strength of said mobile unit is below a secondary prespecified threshold; and responsive to said second ascertaining step, accessing said local cell site data base to obtain said second list of nearby cell sites and transmitting a second command to said signal strength measurement apparatus of said nearby cell sites on said second list to measure and report the signal strength of said mobile unit.

18. The method of claim 17 further comprising the step of:

responsive to the receipt of said report from said signal strength measuring apparatus of said nearby cell sites on said second list, further selecting from said accessed data base second candidate list those antenna/channel groups associated with signal strength reports above said associated primary signal strength threshold.

19. The method of claim 18 further comprising the step of:

still further selecting from said accessed data base first and second candidate lists those antenna/channel groups associated with signal reports above said associated secondary signal strength threshold.

20. In a plural channel mobile communication system for serving mobile units from a plurality of cell sites each equipped with signal strength measuring apparatus and each having one or more antenna/channel groups, a method for transferring control of communications with a mobile unit from one antenna/channel group at one cell site to another antenna/channel group, comprising the steps of:

storing in a data base for said one cell site, first and second lists of nearby cell sites and first and second lists of candidate hand-off antenna/channel groups and associated primary and secondary signal strength thresholds;

first ascertaining at said one cell site when the signal strength of said mobile unit drops below a primary prespecified threshold;

responsive to said signal strength ascertaining step, accessing said data base for said one cell site to obtain said first list of nearby cell sites and transmitting a first command to said signal strength measuring apparatus of said nearby cell sites on said first list to measure and report the signal strength of said mobile unit;

responsive to the receipt of said reports from said signal strength measuring apparatus of said nearby cell sites on said first list, selecting from said accessed data base first candidate list those antenna/channel groups associated with signal strength reports above said associated primary signal strength threshold;

responsive to said first selecting step, if said first selecting step selects no antenna/channel groups, further ascertaining whether the signal strength of said mobile unit is below a secondary prespecified threshold; and responsive to said second ascertaining step, accessing said local cell site data base to obtain said second list of nearby cell sites and transmitting a second command to said signal strength measurement apparatus of said nearby cell sites on said second list to measure and report the signal strength of said mobile unit.

21. The method of claim 20 further comprising the step of:

responsive to the receipt of said report from said signal strength measuring apparatus of said nearby cell sites on said second list, further selecting from said accessed data base second candidate list those antenna/channel groups associated with signal strength reports above said associated primary signal strength threshold.

22. The method of claim 21 further comprising the step of:
still further selecting from said accessed data base first and second candidate lists those antenna/channel groups associated with signal reports above said associated secondary signal strength threshold.

23. The method of claim 20 further comprises the steps of:
storing additional first and second lists of nearby cell sites and candidates antenna/channel groups corresponding to antennas in excess of one at said one cell site, whereby a set of first and second lists of nearby cell sites and candidate antenna/channel groups is stored corresponding to each antenna at said one cell site;
ascertaining which antenna at said one cell site is receiving the strongest signal from said mobile unit:
in which said accessing step further comprises the steps of selecting one set of said first and second lists of nearby cell sites and candidate antenna/channel groups corresponding to said ascertained antenna and accessing said one set of lists.

24. The method of claim 20 further comprising the steps of:
storing additional first and second lists of nearby cell sites and candidate antenna/channel groups corresponding to antennas in excess of one of said one cell site, whereby a set of first and second lists of nearby cell sites and candidate antenna/channel groups is stored corresponding to each antenna at said one cell site;
ascertaining which antenna at said one cell site is communicating with said mobile unit;
in which said accessing step further comprises the steps of selecting one set of said first and second lists of nearby cell sites and candidate antenna/channel groups corresponding to said ascertained antenna and accessing said one set of lists.

25. In a plural channel mobile communication system for serving mobile units from a plurality of cell sites each equipped with signal strength measuring apparatus and each having one or more antenna/channel groups, a method for transferring control of communications with a mobile unit from one antenna/channel group at one cell site to another antenna/channel group, comprising the steps of:
storing in a local cell site data base at said one cell site a list of nearby cell sites;
ascertaining at said one cell site when the signal strength of said mobile unit drops below a prespecified threshold;
responsive to said signal strength ascertaining step, accessing said local cell site data base and generating a request to said nearby cell sites to measure and report the signal strength of said mobile unit.

26. The method of claim 25 in which said step of generating a request comprises the step of generating a data message, said data message comprising the identity of the receiving channel associated with said mobile unit and the identification of said nearby cell sites.

27. The method of claim 25 in which said step of generating a request comprises the step of generating a data message to each of said nearby cell sites, each of said data messages comprising the identity of the receiving channel associated with said mobile unit and a command to measure the signal strength of said receiving channel.

* * * * *

UNITED STATES PATENT AND TRADEMARK OFFICE
CERTIFICATE OF CORRECTION

PATENT NO. : 4,475,010
DATED : October 2, 1984
INVENTOR(S) : George D. Huensch, Robert L. Lien,
Jerol M. Lind, Verne H. MacDonald It is certified that error appears in the above-identified patent and that said Letters Patent is hereby corrected as shown below:

Column 15, Claim 4, line 4, change "at" to --of--.
Column 19, Claim 23, line 14, change "candidates" to --candidate--.

Signed and Sealed this

Twenty-eighth Day of January 1986

[SEAL]

Attest:

Attesting Officer

DONALD J. QUIGG

Commissioner of Patents and Trademarks